April 5, 1966   T. BOXER ETAL   3,244,011
SOLID STATE ACCELEROMETER
Filed Oct. 15, 1962
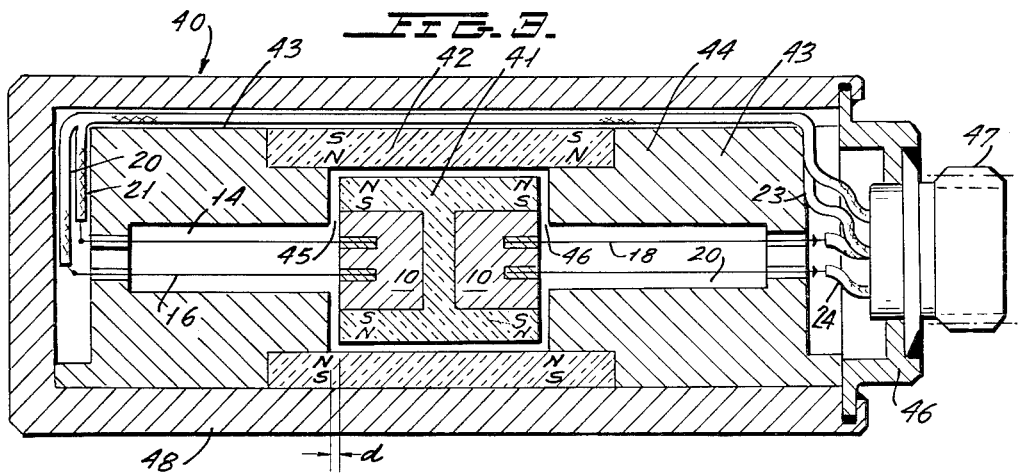
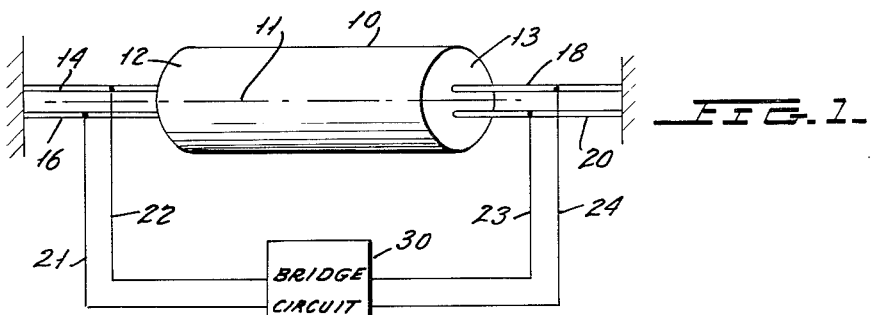
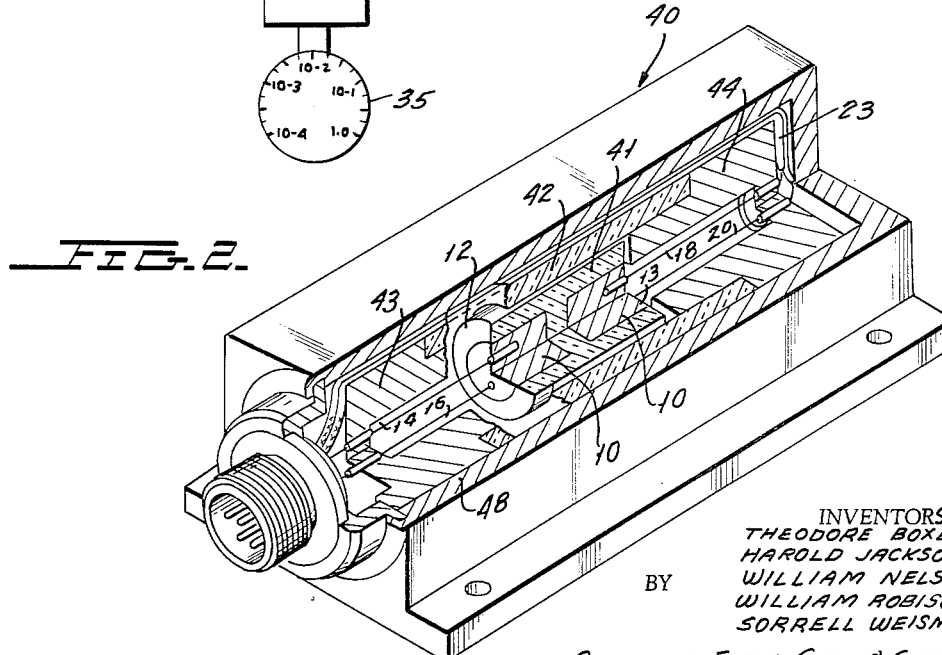
INVENTORS
THEODORE BOXER
HAROLD JACKSON
WILLIAM NELSON
WILLIAM ROBISON
SORRELL WEISMAN
BY OSTROLENK, FABER, GERB & SOFFEN
ATTORNEYS

United States Patent Office

3,244,011
Patented Apr. 5, 1966

3,244,011
SOLID STATE ACCELEROMETER
Theodore Boxer, Forest Hills, Harold Jackson, Brooklyn, William Nelson, Flushing, William Robison, Elmhurst, and Sorrell Weisman, Valley Stream, N.Y., assignors to Kollsman Instrument Corporation, Elmhurst, N.Y., a corporation of New York
Filed Oct. 15, 1962, Ser. No. 230,370
4 Claims. (Cl. 73—517)

This invention relates to a sensitive navigational accelerometer and more particularly to an accelerometer utilizing a piezoresistive transducer to provide improved operating characteristics.

It is known in the inertial instrumentation art to measure acceleration by providing an instrument containing a mass of material to be subjected to the forces of acceleration. Under the influence of acceleration, the mass moves a distance proportional to the applied load. The moving mass is typically interconnected to a visual display, as by mechanical linkages, to thereby provide an indication responsive to acceleration. Such accelerometers are, however, limited as to range, accuracy, response time and linearity, thereby restricting their utility for rocket and missile applications.

My invention provides an improved accelerometer structure yielding preferable operating characteristics over the heretofore known devices. Basically, our invention provides a structure wherein a floating seismic mass is axially supported by piezoresistive semiconductive fibers. The opposite ends of the fibers are secured to the instrument housing whereby the inertial acceleration forces of the seismic mass are opposed by the reacting forces in the piezo-resisitive semiconductor fiber supports. This results in a change in fiber resistance as a function of acceleration of the device, to thereby permit a direct instantaneous external electrical read-out which is a function of the acceleration. These fibers have appropriate doping levels and crystallographic orientation such that the fibers will have a high ratio of resistive change to longitudinal dimensional change.

In the preferred illustrative embodiment of our invention, the piezo-resistive fiber support structure comprises an individual pair of fibers located at each end of the seismic mass. These fiber pairs constitute independent closed electrical loops, each comprising one branch of a conventional bridge measuring circuit. The fibers are preferably assembled in a state of initial tension, such that axial forces acting on the seismic mass effect an increase in the tension of one branch and a reduction in the tension of the other branch. The resistive unbalance results in a current flow through the bridge circuit, which current flow may be calibrated to be a measure of acceleration magnitude. This structure minimizes the effect of moderate side loading. Any lateral deflection of the seismic mass will cause identical simultaneous elongation of the fiber loops resulting in a cancellation of the resistive change.

The seismic mass is illustratively shown as suspended in a floating manner by a pair of cooperating axial magnets, one being stationarily disposed within the housing, and the other encircling the seismic mass. The poles of the magnets are appropriately located to maintain the seismic mass in a floating relationhip with respect to the support magnet. Axial and radial stops are provided to prevent excessive straining of the piezo-resistive fibers under shock loads or acceleration magnitudes exceeding the operating range of the device.

The entire unit may be assembled within a unitary compact housing having a four-prong electrical connector, corresponding to the outputs of each of the support fibers. The output of the device may be connected to a conventional bridge circuit, having meter output appropriately calibrated in magnitudes of acceleration.

It is therefore seen that the basic concept of our invention resides in the use of a piezoresistive transducer means operatively connected to a seismic mass to thereby provide a direct electrical indication of acceleration.

It is therefore a primary object of this invention to provide a solid state aircraft and missile accelerometer having increased sensitivity, linearity and range.

A further object of this invention is to provide an aircraft and missile accelerometer wherein a seismic mass is appropriately supported by piezoresistive silicon fibers to present a resistive output signal operatively related to the acceleration inertia forces of the seismic mass.

An additional object of this invention is to provide such an aircraft and missile accelerometer wherein the seismic mass is suspended in a floating arrangement by a pair of cooperating magnets.

Still a further object of this invention is to provide an aircraft and missile accelerometer including a seismic mass axially supported by a first and second pair of piezoresistive fibers, the fibers forming the branches of an output bridge circuit.

Still another object of this invention is to provide such an aircraft and missile accelerometer wherein the axial inertia forces of the seismic mass during acceleration increase the tension of one pair of support fibers and reduce the tension in the other pair of support fibers, thereby unbalancing the bridge.

These as well as other objects of this invention will become apparent from the following description and accompanying drawings in which:

FIGURE 1 is a schematic perspective view illustrating the basic concept of our invention.

FIGURE 2 is a partially cut-away perspective view of an aircraft and missile accelerometer constructed in accordance with the teachings of our invention.

FIGURE 3 is a longitudinal cross-sectional view of the accelerometer of FIGURE 1.

Referring to FIGURE 1, seismic mass 10 is supported along the longitudinal axis 11 by piezoresistive fiber pairs 14–16 and 18–20 appropriately connected to opposite ends 12, 13. Seismic mass 10 is appropriately oriented within the aircraft or missile such that acceleration will provide an axial inertia force.

Semi-conductor fiber support pairs 14–16 and 18–20 serve as the basic transducing element and are appropriately constructed to have a large ratio of resistive change to dimensional change. Typically, these elements may be silicon piezoresistive fibers appropriately processed by controlling doping levels and crystallographic orientation to have characteristics desirable for the particular application, with strain gage factors of 80 being feasible. The fibers are preferably assembled in a state of initial tension such that the axial forces acting on the seismic mass 10 effect an increase in the tension of one of the pairs, as for example 14–16 and a reduction in the tension of the other pair, as for example 18–20. The piezo-resisitive fiber transducers are directly connected to a conventional bridge circuit 30 via leads 21–24.

Each of the fiber pairs of the accelerometer form a closed electrical loop, and constitute a branch of bridge circuit 30. During periods of non-acceleration the bridge will be balanced. The resistive unbalance resulting from the tension forces exerted on the fiber pairs during periods of acceleration will effect an unbalance of the bridge. The unbalanced current may then be appropriately calibrated to provide a visual indication 35 of the acceleration magnitude.

It is therefore seen that the solid-state accelerometer of our invention provides a direct indication of acceleration while avoiding the limitations imposed by the mechanical linkages of the prior art devices.

FIGURES 2 and 3 illustrate one form of a practical embodiment of an accelerometer constructed in accordance with the basic teachings of our invention.

Part numbers corresponding to those shown in FIGURE 1 are similarly numbered. Accelerometer 40 is contained in housing 48 fabricated of or clad with mu-metal, for the reason to be subsequently set forth below. Seismic mass 10 is axially supported therein in a floating arrangement by the cooperation of permanent magnets 41 and 42. Permanent magnet 41 encloses seismic mass 10 and is axially movable with respect to magnet 42. The magnetic suspension of the seismic mass is preferably provided to minimize transverse deflections under transverse loads, thus offering excellent lateral stability, insensitivity and uncompromised axial sensitivity. Small lateral deflections which will occur under moderate side loadings will have a negligible effect on the read-out of the device since both fiber pairs 14–16 and 18–20 will be experiencing identical simultaneous elongation resulting in a cancellation of the resistive change presented to the bridge circuit 30. The magnetic flux field also provides a damping medium for the movement of seismic mass 10. If necessary, additional damping may be provided by the introduction of an appropriate fluid medium.

The opposite ends of the support fibers 14–20 are securably fastened to end plugs 43, 44. End plugs 43, 44 are preferably integral with housing 48 to provide an accurate mounting reference. This integral structure will also serve to minimize the possibility of unit resonances occurring when the accelerometer 40 is subjected to vibrations. The centrally extending lateral surfaces 45, 46 of the end plugs are positioned a small distance $d$ from the ends of seismic mass 10 to thereby provide an axial stop. Such a stop prevents straining of the fibers to the breaking stress under shock loads or acceleration magnitudes exceeding the operating range of the device. Likewise, the clearance between magnets 41 and 42 serves as a radial stop. End plate 46 is appropriately fastened to main housing section 41, as by soldering. Conductors 21–24 are interconnected to conventional outlet receptacle 47 in a manner facilitating the connection of accelerometer 40 to an appropriate bridge circuit.

Housing 40 is formed of mu-metal to provide magnetic isolation of the device. The use of this material will prevent the polarization of the permanent magnets 41, 42 from being affected by strong adjacent electromagnetic fields and also prevent these magnets from affecting adjacent components.

It is thus seen that our invention provides a compact and simplified aircraft and missile accelerometer which utilizes piezoresistive fibers as the basic transducer element. Inasmuch as piezoresistive silicon fibers may be constructed to be substantially independent of ambient temperature change, the accelerometer is completely temperature compensated.

Without thereby limiting the scope of the invention, there are given below data of a commercial form of accelerometer embodying the concepts of this invention.

The complete unit is to be contained within a housing section of length 3⅞″, height 1⅜″ and width 1⅜″, and has an approximate weight of twelve ounces.

The threshold of resolution of measurement is approximately $10^{-4}$ G with an operating range of $10^{-4}$ to 1.0 G. However, the operating range may be displaced to permit any desired acceleration measurement up to several hundred G's. A linearity of 0.01% of full scale reading may be obtained. Measurement response time is less than $10^{-10}$ seconds.

The piezo-resistive pair branch resistance may typically be 1,000 ohms at zero G, permitting a measurement bridge circuit input of 10 milliamps at 10 volts with an output of 50 microvolts per $10^{-4}$ G.

In the foregoing this invention has been described in conjunction with a preferred illustrative embodiment. Since many variations and modifications will now become apparent to those skilled in the art, we prefer therefore not to be limited to the specific disclosure contained herein but only by the appended claims.

The embodiments of the invention in which an exclusive privilege or property is claimed are defined as follows:

1. An accelerometer for supersonic aircraft and missiles, comprising in combination: a seismic mass; means suspending said seismic mass to be responsive to the inertia force of a moving craft; transducer means operatively connected to said seismic mass to produce a mechanical stress in said transducer means related to the inertia force of said seismic mass; said transducer means constructed to effect a variation in electrical resistance in accordance with said mechanical stress; conductor means connected to said transducer means to provide an electrical output signal responsive to said resistance variation for indicating acceleration; said suspending means operatively positioned with respect to said seismic mass to substantially limit its movement to a first direction only; the resistive sensitivity of said transducer means corresponding to mechanical stresses in said first direction; said electromechanical transducer means including piezoresistive semiconductor fibers; said fibers operatively positioned to provide support for said seismic mass and oppose movement of said seismic mass; said fibers including a first and second pair axially located at opposed ends of said seismic mass; said seismic mass positioned whereby the inertia forces during acceleration provide an axial force; said axial force increasing tension in one of said pair of fibers, and reducing tension in the other of said pair of fibers, to provide a resultant resistive output signal responsive to acceleration; said suspending means comprising a cooperating pair of magnets axially located in the direction of said seismic mass, a first one of said cooperating pair of magnets integrally formed with and peripherally surrounding said seismic mass to form a seismic mass unit, a second one of said cooperating pair of magnets having a hollowed cylindrical configuration, defining an inner elongated volume for the reception of said seismic mass unit in spaced-separated, close confronting relationship therewith; the poles of said magnets being interrelated to suspendingly locate said seismic mass unit, while resisting movement thereof in a direction transverse to said axial force; the space-separation between the outer peripheral surface of said seismic mass unit, and the inner volume of said second magnet defining the maximum extent of transverse displacement, whereby said second magnet provides a transverse stop means for said seismic mass unit.

2. An accelerometer for supersonic aircraft and missiles, comprising in combination: a seismic mass; means suspending said seismic mass to be responsive to the inertia force of a moving craft; transducer means operatively connected to said seismic mass to produce a mechanical stress in said transducer means related to the inertia force of said seismic mass; said transducer means constructed to effect a variation in electrical resistance in accordance with said mechanical stress; conductor means connected to said transducer means to provide an electrical output signal responsive to said resistance variation for indicating acceleration; said suspending means operatively positioned with respect to said seismic mass to substantially limit its movement to a first direction only; the resistive sensitivity of said transducer means corresponding to mechanical stresses in said first direction; said electromechanical transducer means including piezoresistive semiconductor fibers; said fibers operatively positioned to provide support for said seismic mass and oppose movement of said seismic mass; said fibers including a first and second pair axially located at opposed ends of said seismic mass; said seismic mass positioned whereby the inertia forces during acceleration provide an axial force; said axial force increasing tension in one of said pair of fibers, and reducing tension in the other of said pair of fibers, to provide a resultant resistive output signal responsive to acceleration; said suspending means comprising a cooperating pair of magnets axially located in the direction of said seismic mass; a first one of said cooperating pair of magnets integrally formed with and peripherally surrounding said seismic mass to form a seismic mass unit, a second one of said cooperating pair of magnets having a hollowed cylindrical configuration, defining an inner elongated volume for the reception of said seismic mass unit in spaced-separated, close confronting relationship therewith; the poles of said magnets being interrelated to suspendingly locate said seismic mass unit, while resisting movement thereof in a direction transverse to said axial force; the space-separation between the outer peripheral surface of said seismic mass unit, and the inner volume of said second magnet defining the maximum extent of transverse displacement, whereby said second magnet provides a transverse stop means for said seismic mass unit, each of said first and second fiber pairs comprising a closed electrical loop; said loops constructed to provide a balanced output signal during periods of constant craft speed; lateral deflection of said seismic mass producing equal stresses in said first and second fiber pairs, thereby producing a zero resultant signal output.

3. An instrument for supersonic aircraft and missiles comprising a housing having a longitudinal axis; a seismic mass centrally positioned along said axis; piezo-resistive semiconductor fibers connected to opposite ends of said seismic mass, and to the end regions of said housing; said seismic mass being subjected to axial inertia forces of acceleration; said axial forces producing mechanical stresses in said piezo-resistive fibers, whereby their resistance is caused to vary; conductor means connected to said piezo-resisitive fibers to provide an electrical output signal responsive to said resistance variation for indicating acceleration; a suspending means operatively positioned with respect to said seismic mass to substantially limit its movement to the axial direction only; the resistive sensitivity of said fibers corresponding to mechanical stresses in said axial direction; said suspending means comprising a cooperating pair of magnets axially located in the direction of said seismic mass, a first one of said cooperating pair of magnets integrally formed with and peripherally surrounding said seismic mass to form a seismic mass unit, a second one of said cooperating pair of magnets having a hollowed cylindrical configuration, defining an inner elongated volume for the reception of said seismic mass unit in spaced-separated, close confronting relationship therewith; the poles of said magnets being interrelated to suspendingly locate said seismic mass unit, while resisting movement thereof in a direction transverse to said axial force; the space-separation between the outer peripheral surface of said seismic mass unit, and the inner volume of said second magnet defining the maximum extent of transverse displacement, whereby said second magnet provides a transverse stop means for said seismic mass unit.

4. An aircraft instrument as set forth in claim 3 further including an additional stop means integrally formed with said housing for limiting the axial movement of said seismic mass to within a predetermined amount; said additional stop means including surfaces closely confronting the ends of said seismic mass unit, said additional stop means comprising surfaces in space-separated, close confronting relationship with the end surfaces of said seismic mass unit.

References Cited by the Examiner

UNITED STATES PATENTS

| 2,435,231 | 2/1948 | McPherson | 73—517 |
|---|---|---|---|
| 2,852,243 | 9/1958 | Shepard | 73—517 |
| 3,002,391 | 10/1961 | Holmes | 73—517 |
| 3,010,325 | 11/1961 | Harkness | 73—517 |
| 3,015,959 | 1/1962 | Pratt | 73—517 |
| 3,024,659 | 3/1962 | White | 73—401 |
| 3,031,634 | 4/1962 | Vogt | 73—88.5 |
| 3,046,792 | 7/1962 | Morgan | 73—517 |
| 3,096,652 | 7/1963 | Cornelison | 73—517 |

FOREIGN PATENTS

| 585,140 | 1/1947 | Great Britain. |
|---|---|---|

RICHARD C. QUEISSER, *Primary Examiner.*

JOSEPH P. STRIZAK, JAMES J. GILL, *Examiners.*